United States Patent [19]

Petusky et al.

[11] 3,940,127
[45] Feb. 24, 1976

[54] PROGRAMMABLY ALTERABLE INCREMENTING SYSTEM

[75] Inventors: Neil J. Petusky, Norristown; Ronald V. Kadyszewski, Aston, both of Pa.

[73] Assignee: Decision Data Computer Corporation, Horsham, Pa.

[22] Filed: Apr. 8, 1974

[21] Appl. No.: 458,517

[52] U.S. Cl. .................................. 271/266; 234/126
[51] Int. Cl.² ............................................ B65H 5/06
[58] Field of Search ................. 271/266, 265; 83/74; 234/126, 130

[56] References Cited
UNITED STATES PATENTS

| | | | |
|---|---|---|---|
| 3,342,410 | 9/1967 | Masterson et al. | 234/126 X |
| 3,521,880 | 7/1970 | Shebanow et al. | 271/265 |
| 3,706,248 | 12/1972 | Erhart | 83/74 |

Primary Examiner—John J. Love
Assistant Examiner—Bruce H. Stoner, Jr.
Attorney, Agent, or Firm—Synnestvedt & Lechner

[57] ABSTRACT

A programmably alterable incrementing system particularly adapted for use in conjunction with an apparatus for selectively indexing punch cards or like sheet material through a work station; such apparatus being particularly susceptible to errors in tolerance such as may be due to inaccuracies in mechanical components, but which are particularly attributable to variation in humidity conditions. Means including a stepping switch are provided to introduce a corrective factor, as needed, into the indexing system to ensure that the required correspondence exists between the actual and the intended increment imparted to a punch card as it is advanced through the work station.

6 Claims, 14 Drawing Figures

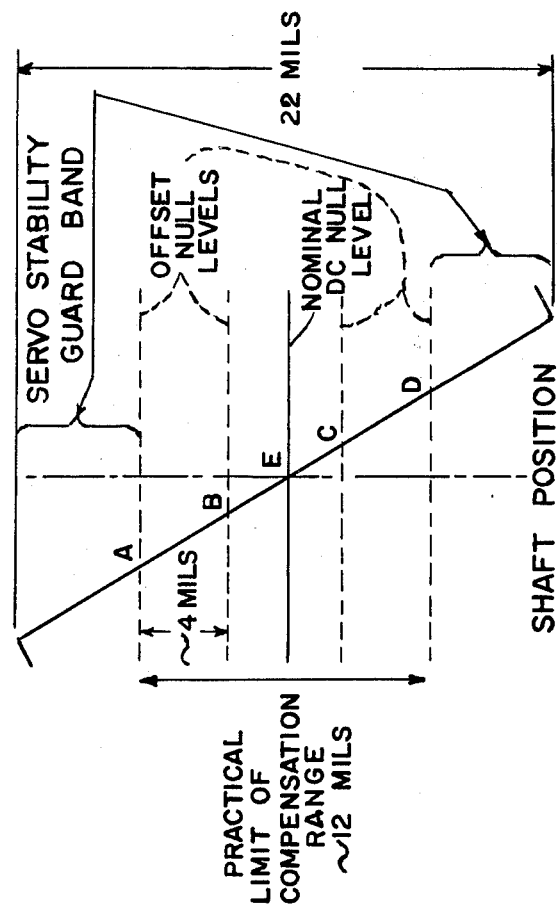
Fig.2A.
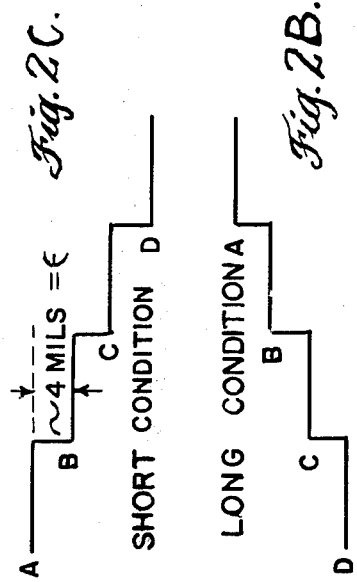
Fig.2C.
Fig.2B.
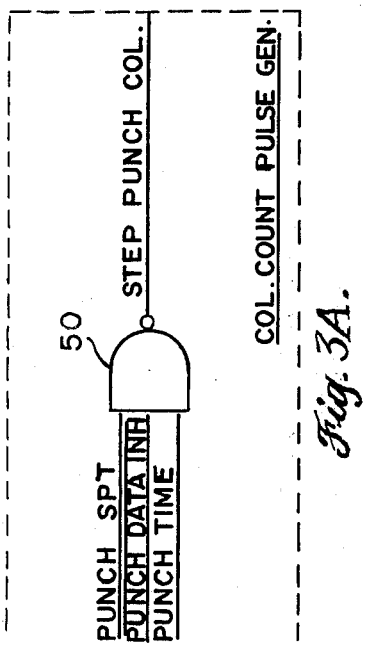
Fig.3A.
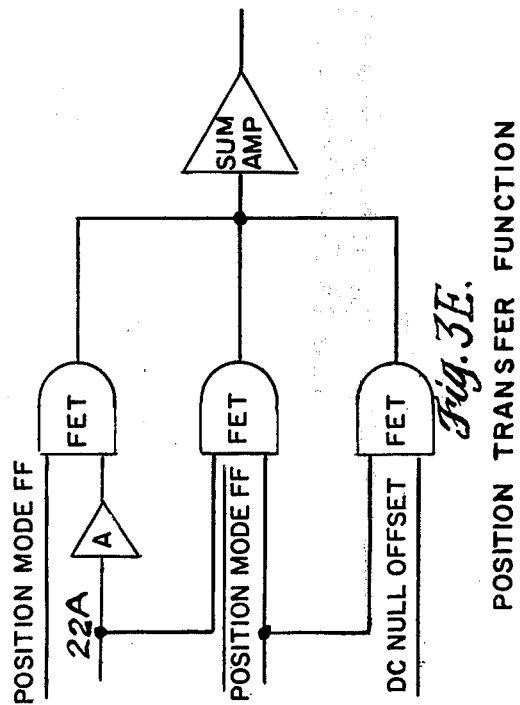
Fig.3E.
POSITION TRANSFER FUNCTION

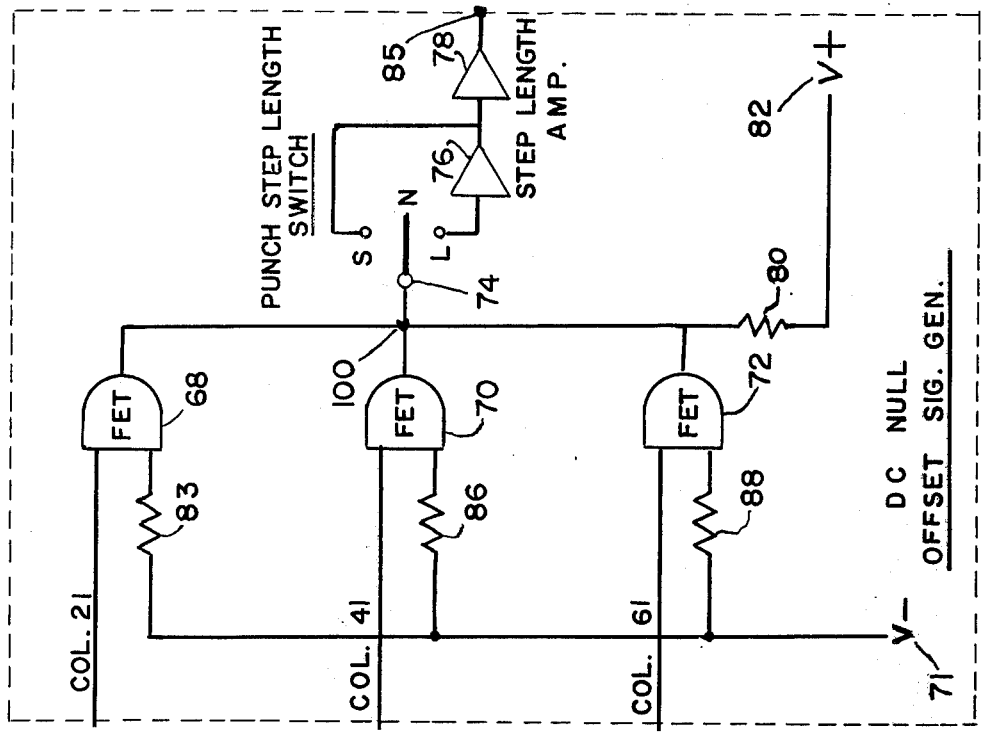
FIG.3D
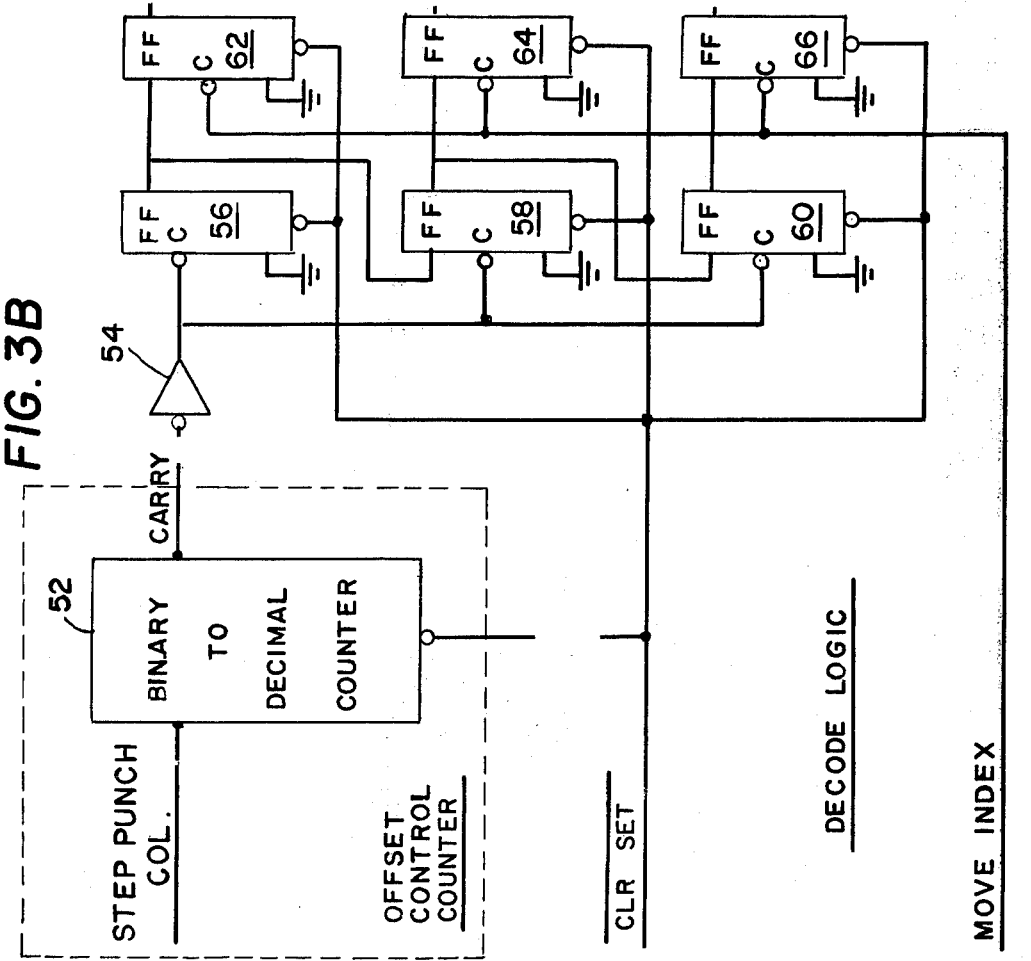
FIG.3B
FIG.3C

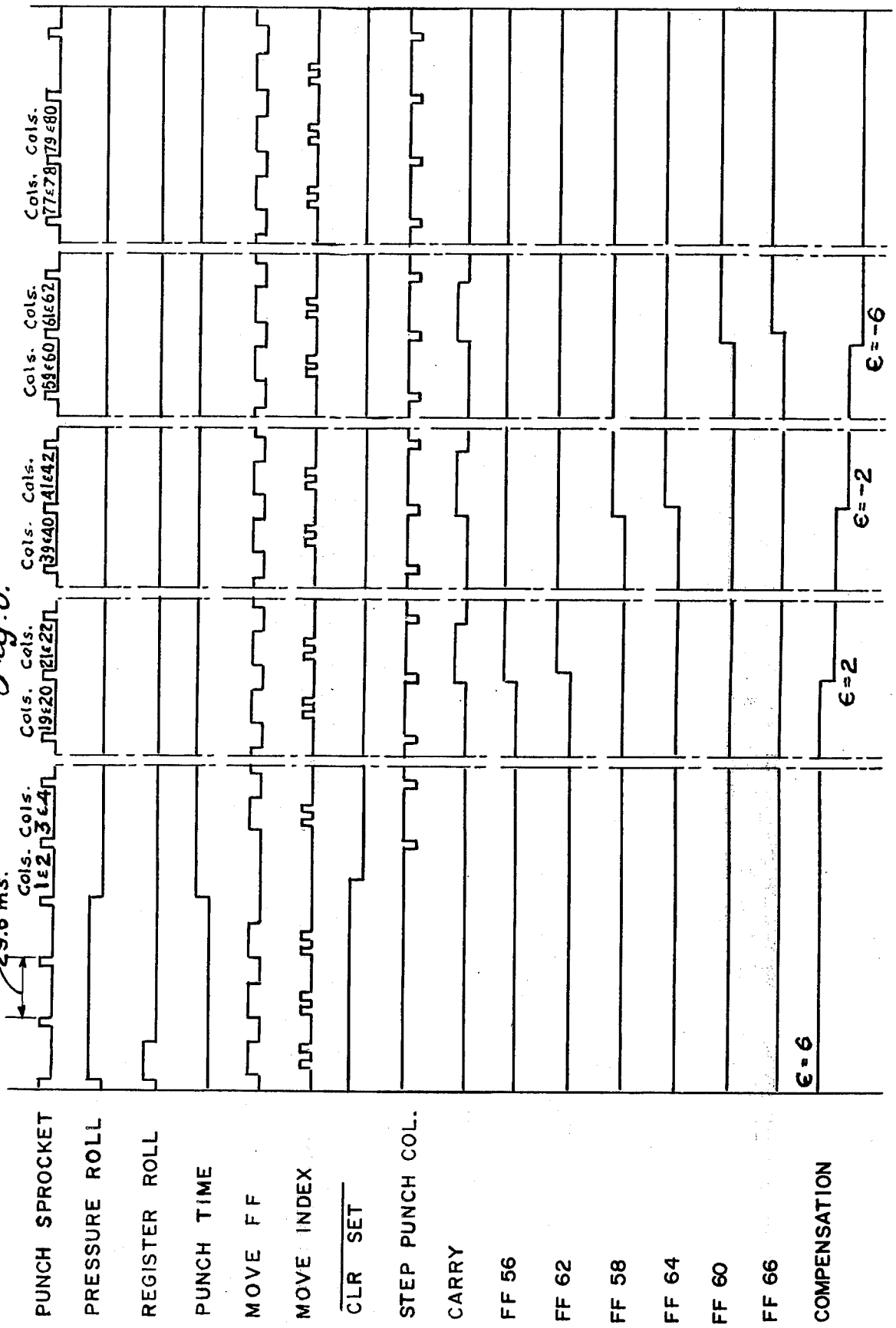

PROGRAMMABLY ALTERABLE INCREMENTING SYSTEM

BACKGROUND OF THE INVENTION

The present invention relates to incrementing systems particularly of the type used in conjunction with a punch card preparation device. Such an incrementing system is the subject of the co-pending patent application of Albert Romeo et al. entitled Card Advancement Mechanism, bearing Ser. No. 402,328 and filed Oct. 1, 1973, the contents of which are incorporated herein by reference. Incrementing systems in the nature of that disclosed in the aforementioned Romeo et al. appplication are adapted to advance a punch card on a selective rather than an incremental basis. As a result of the selective advancement capability such indexing systems are particularly susceptible to errors such as result from a failure to observe mechanical tolerances in the fabrication or assembly of machine components since the results of such errors are usually reflected in a cumulative manner. Such errors may also be caused by variations in humidity conditions.

A punch card constitutes a convenient medium for storing information both at the input and output of a data processing system. Punch cards come in a variety of lengths, the most common of which is the 80 column version so designated because of a corresponding number of columns which are evenly spaced over the length of the card; each column comprises 12 rows such that the punch card in total yields some 960 possible punch positions.

Various punching techniques are available, including gang punching, whereby information may be entered into any or all of the 960 punch positions simultaneously. Serial punching techniques are also available whereby all positions of a single row or a single column may be simultaneously punched. Variations of the gang and serial punching techniques are also known. In the preferred embodiment of the present invention information is simultaneously punched into the punch positions comprising two cards columns.

Because of the large amount of information generated within a data processing system there is a need to expedite the preparation of punch cards; however, this latter need is secondary to the need to accurately position the punch information relative to the face of the punch card. Mechanical tolerances of the punching mechanism are extremely small in order to insure that information being entered into the punch card will be correctly interpreted in a subsequent processing operation. Thus, the punch aperture separation between adjacent columns generally employed is 0.087 inch, measured from center to center of adjacent punch apertures. A tolerance of ± 0.010 inch is permitted; this tolerance being dictated in part by the resolution power of the punch card reading equipment. The latter may register an error condition if the differences in punch aperture spacing exceeds the allowed tolerance. It is therefore important that the center line of the aperture be accurately determined. For this purpose the center line of each aperture may be located relative to the leading edge of the punch card by the card reading mechanism. It is possible that an error introduced between adjacent punch apertures will be compounded over the length of the punch card, thus resulting in an error condition being detected in the subsequent processing of the punch card. This is particularly true of systems wherein the punch card is selectively indexed through the punch or read stations. In selective indexing a punch card is stopped at only those columnar positions at which information is to be entered.

In the selective indexing systems once a punch card has been positioned at the punch station and the leading edge or first columnar position has been brought into registration with respect to the indexing system the further advancement of the punch card proceeds somewhat independent of any reference indicia or reference point appearing thereon. Thus, a punch card is translated from one columnar position to another by rotating an index wheel through a predetermined amount such that the periphery of the index wheel, which is in contact with the punch card, advances the latter to the next punch location whereat information is to be entered. After entry of the information therein, the punch card is again rapidly advanced to the next columnar position at which information is to be entered. This may mean the punch card is incremented one columnar position between successive stops (in the preferred embodiment of the present invention the minimum increment would be two columnar positions) or it may be advanced any number of columnar positions within the limit of the balance of columnar positions remaining on the card.

The indexing system is theoretically designed to advance a punch card in exact columnar increments; however, various influencing factors are known to result in the development of a displacement, or error factor, between the actual advancement and the intended advancement. The mechanical tolerance related to the diameter of the index wheel is one factor which contributes to the development of displacements in such a selective indexing system; however, also critical is the possible affect of high humidity on the card length.

SUMMARY OF THE INVENTION

In order to accurately interpret information entered into a punch card it is important that the information, as it is being entered, be accurately positioned with respect to the face of the punch card. Errors due to mechanical tolerances and changes in weather conditions such as are noted above cannot be tolerated. Accordingly, it is a principal object of the present invention to provide means for use in conjunction with the indexing portion of a punch card preparation apparatus to compensate for differences between the actual and intended increment imparted to a punch card or like sheet material in an indexing system whether such differences are relatively fixed, as are those due to mechanical tolerances, or whether they are of a changing nature such as are due to changes in humidity conditions. In order to achieve the principal object of the present invention switching means are provided for use in conjunction with the indexing system, which switching means can be manually set whenever an error condition in excess of a predetermined minimum is registered by the indexing system. The switching means, when set, introduces a compensating increment of distance to be distributed, i.e. added or subtracted, over the card length as the punch card is advanced by means of the indexing system. In this manner allowances are made for displacements between intended and actual length of increments brought about for any reason.

It should be understood that the subject invention may serve as a means to correct mechanical deficiencies detected in the indexing portion of a punch card apparatus upon completion of the manufacture thereof and prior to the shipment to a customer; and after installation, as a means for continually compensating for changes in the intra-columnar spacing of a punch card due to changes in humidity conditions as measured between the time a punch card is prepared and a time subsequent thereto when the informational content of the punch card is being interpreted. If a punch card is prepared under relatively high humidity conditions and then is exposed to a dry atmosphere it may shrink considerably such that the spacing between adjacent apertures is no longer within the allowable tolerance, especially where the card is processed in a selectively indexable advancing system such that a cumulative error results.

Although recognition has been extended to the substantial influence humidity conditions may have on the preparation and processing of punch cards, Applicants are unaware of any attempt to compensate for the adverse effects of such conditions during the initial preparation of the punch card. Attempts are known to have been made to compensate for displacement errors incurred during the interpretive processing phase of punch cards, i.e. during the card read cycle. Such attempts have resulted in the development of elaborate systems to measure columnar spacing and introduce a correction factor accordingly; however, these compensating techniques are at best "after-the-fact" techniques and are not designed to compensate directly for such conditions at the point in time when the punch card is being prepared.

An approach, which has been tried in the related field of sheet feeding for xerography purposes, involves an attempt to control the humidity conditions within the sheet feeding apparatus by sensing the relative humidity and drying out the sheet material accordingly. The benefits of this latter approach have indirectly been available in earlier versions of electronic data processing equipment which, because of the fragile and yet electrically inefficient nature of the electronic equipment employed, it was necessary to provide a fairly stable operating environment. The controlled environmental conditions in turn resulted in a relative stable value of humidity in the punch cards. Because of the expanded use of data processing techniques and equipment these same controlled environmental conditions no longer prevail, at least to the extent that they once did, and as a consequence one is now more likely to find data processing equipment, particularly of the nature herein involved, in uncontrolled environmental conditions and thus subject to the normal extremes in humidity.

The preferred embodiment of the programmably alterable incrementing system constituting the subject of the present invention comprises a three position switch which operates in conjunction with signals generated in an associated servo actuated indexing system to introduce a positive, negative or zero correction factor to the length of card increment which is otherwise independently brought about by the indexing mechanism. The correction factor is distributed over the entire length of the punch card as a plurality of smaller increments, being either added to or subtracted from the normal spacing between adjacent columnar positions. In this manner the actual length of card increment effective over the entire length of the punch card is maintained within the tolerance limits prescribed by the punch card reading equipment.

Insofar as the error displacement introduced by both mechanical and humidity conditions is cumulative in nature it is only necessary to introduce a correction factor on a periodic basis, i.e. once every few columns, to ensure that the cumulative displacement does not exceed the tolerance limits of the equipment. In the preferred embodiment of the present invention this is accomplished by introducing a corrective factor, if needed, after incrementing through every 20 columnar positions. Thus, for 80 column punch card equipment, three such adjustments are introduced, these occurring at approximately the 20th, 40th and 60th columnar positions. The number and size of adjustment may be varied to meet the operative needs and standards of the equipment involved. In this respect it is only necessary to ensure that each correction factor does not introduce a displacement which exceeds the tolerances prescribed by the card reading equipment. In the 80 column card equipment comprising the preferred embodiment of the present invention, this end is achieved by introducing an overall adjustment capability of some 12 mils.

IN THE DRAWINGS

Figure 1A:
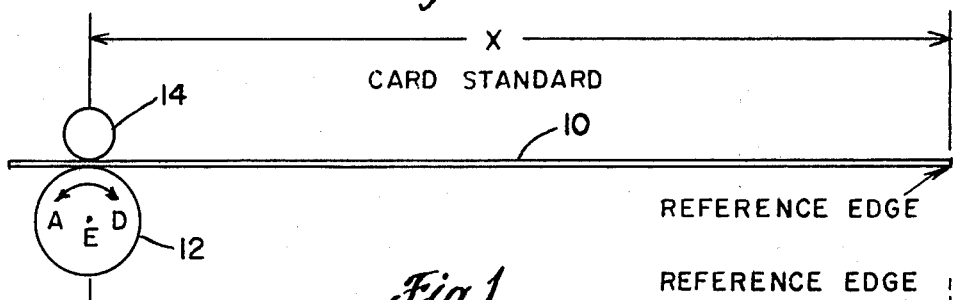
FIG. 1A is a profile view of the dimensional and positional portions of the assembly depicted in FIG. 1.
Figure 1:
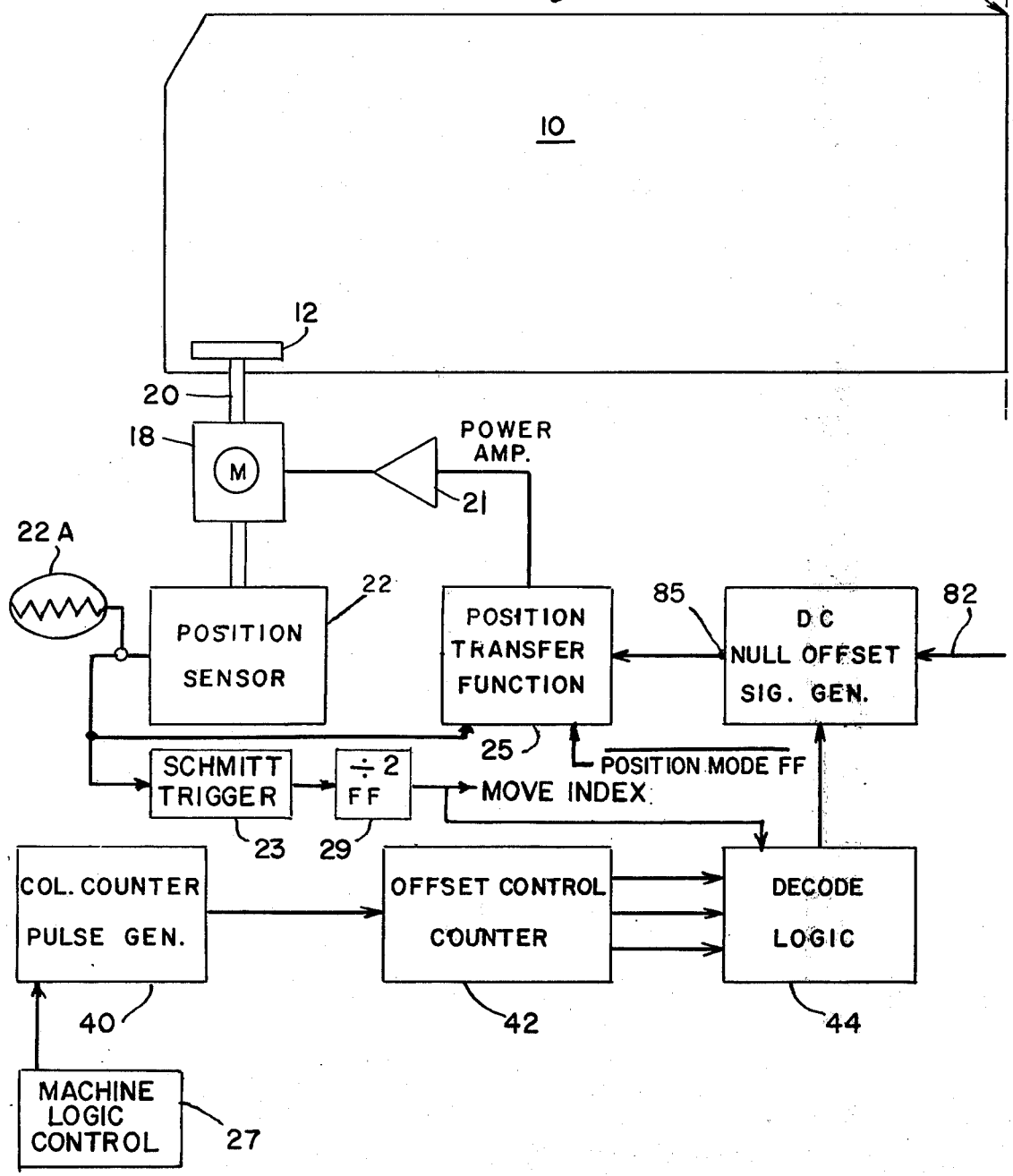
FIG. 1 is a partial system schematic illustrating dimensional and positional relationships between the card positioning-incrementing assembly and the work station; and further illustrating in block diagrammatic fashion the operative relationship of the components comprising the feedback network for sensing and further controlling the position of the card incrementing means.
Figure 1B:
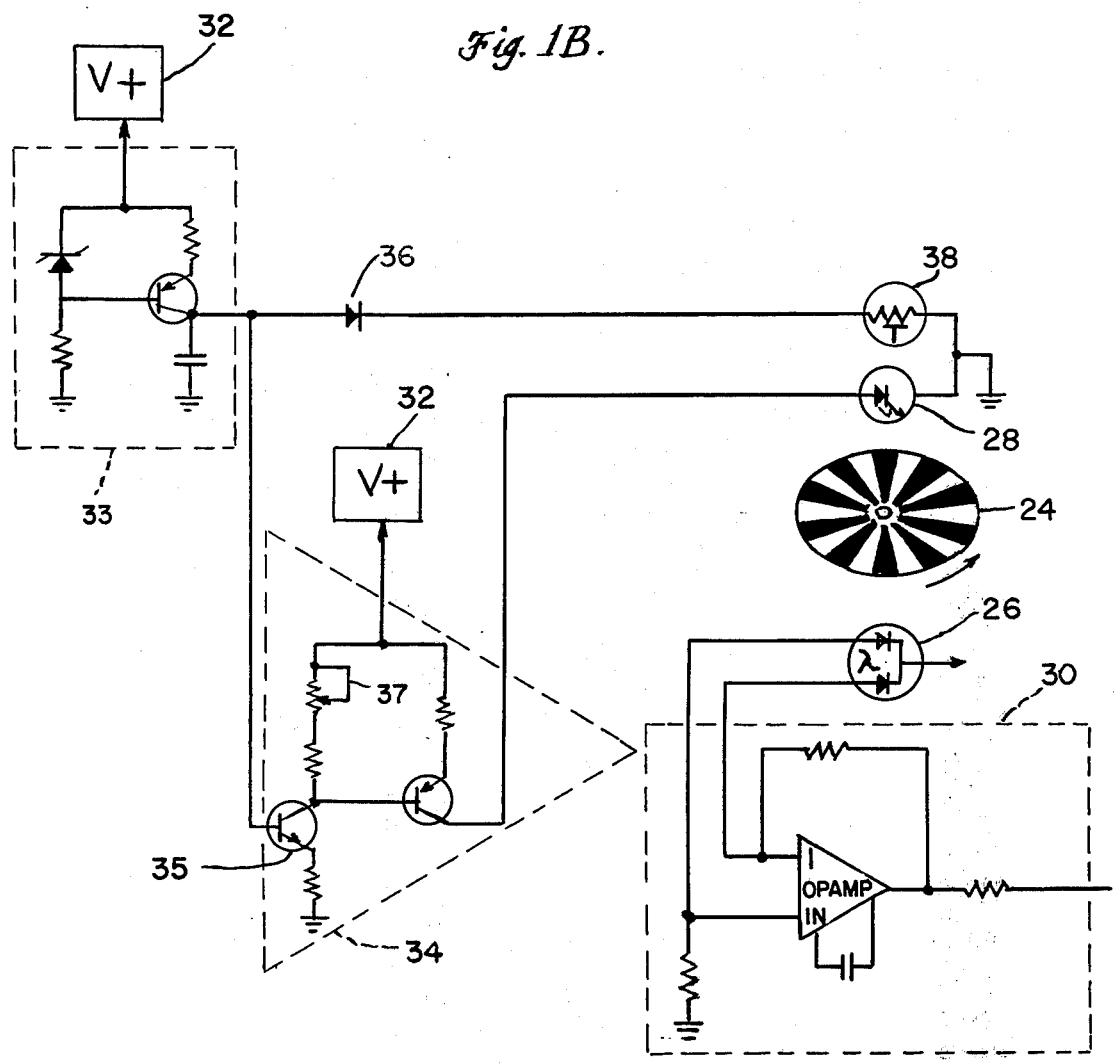
Figure 1C:
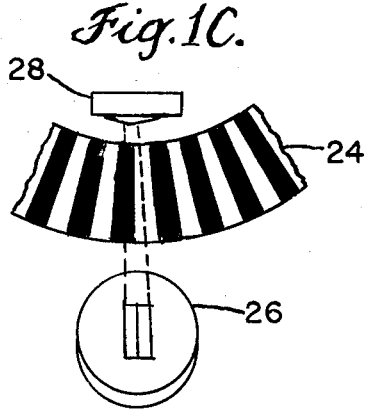
Figure 4:
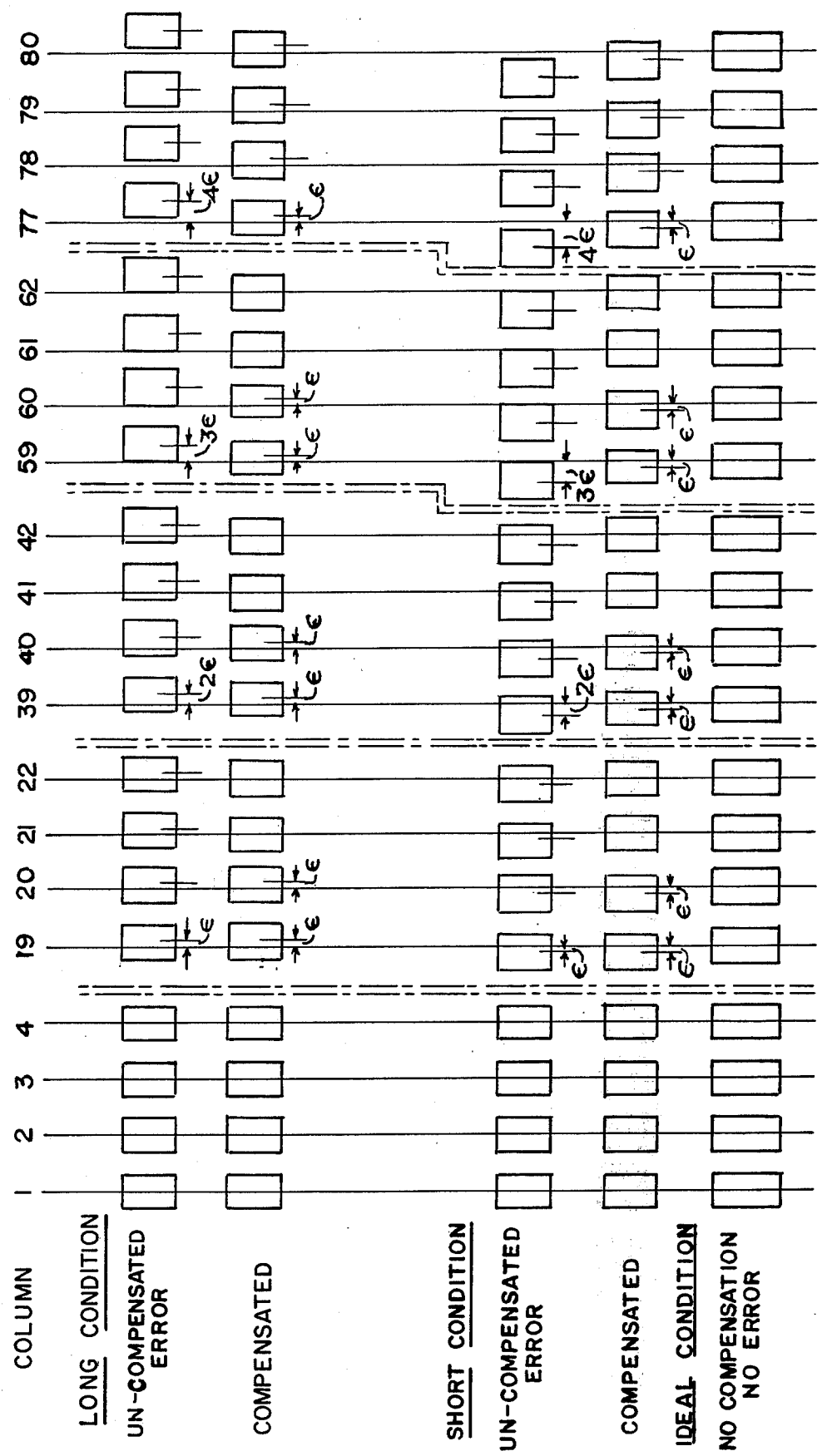

FIG. 1B details the Position Sensor of FIG. 1;

FIG. 1C details a portion of the Sensor of FIG. 1B;

FIG. 2A depicts a portion of a waveform generated by the Position Sensor of FIG. 1B, the enlarged portion of the waveform includes plural operating points each of which corresponds to a stable shaft position assumed in consequence of the fact that an appropriate correction factor has been introduced;

FIGS. 2B and 2C represent the direction and magnitude of correction factors introduced into a punch card during the preparation thereof in order to compensate for either a "long" or a "short" condition which would otherwise result in a corresponding error in the punch card;

FIGS. 3A, 3B, 3C, 3D, and 3E are circuit schematics illustrating the construction details of corresponding portions of the programmably alterable incrementing system of FIG. 1;

FIG. 4 is a chart comparing the need for and the results achieved by means of the present invention in compensating for a long and a short condition; these results being further contrasted with an "ideal" condition in which no compensation is required; and, FIG. 5 illustrates comparative timing of basic pulses provided by the control circuitry of FIGS. 3, or otherwise generated by corresponding portions of the subject data recorder, to enable the introduction of appropriate correction factors.

DESCRIPTION OF THE PREFERRED EMBODIMENT

Turning now to FIGS. 1 and 1A, therein is disclosed a system-schematic illustrating the relationship between the card incrementing means used to advance an 80 column punch card and the further relationship between these incrementing means and the control circuitry therefor. A punch card 10 is releasably engaged with an index roll 12 by means of a relay actuated, spring biased, pressure roll 14, the latter being selectively retracted by means of the relay (not shown) during the initial phase of a card positioning operation to enable the leading edge of the punch card 10 to pass between the index roll and the pressure roll. In the preferred embodiment of the present invention the trailing edge of the punch card is referred to as the reference edge; there being means (not shown) operative during the initial phase of a card positioning operation (i.e., at "Register Roll" time, see FIG. 5) to contact the reference edge of the punch card and to bring the first two columns of the punch card into exact registration with respect to a work station. The mechanism for contacting the punch card by its reference edge and advancing it into registration at the work station is fully disclosed in the co-pending application of Alexander Hunter entitled CARD FEED MECHANISM, filed June 29, 1973 as Ser. No. 374,869. It is the function of the present invention to introduce a compensation factor of whatever magnitude may be required to ensure that the punch card is in exact registration with the work station at all times during the processing of the punch card therethrough.

The index wheel 12 is mechanically connected to a DC motor 18 by means of a shaft 20. Motor 18 may comprise a servo motor of conventional design. Also connected to the motor shaft 20 is a position sensor diagrammatically represented in FIG. 1 as member 22. The position sensor 22 may comprise a calibrated disc mounted directly on the motor shaft 20 so as to synchronously rotate with the index wheel 12. Conventional photoelectric sensing means may be used to scan the calibrated disc so as to continuously monitor the position of the index wheel 12 and hence the relative position of a punch card in engagement with the indexing mechanism.

As seen in FIG. 1B, the sensing means employed in the preferred embodiment of the present invention comprise a disc 24 operatively positioned between dual photo diodes 26 and a point source light beam emitted from a light emitting diode 28. The light emitting diode 28 is positioned so as to evenly irradiate the dual photo diodes 26 such that in the absence of the disc 24 each of the photo diodes would be equally illuminated and as a consequence a difference amplifier 30, connected to the two output leads from the photo diodes, would generate a null difference signal. Disc 24 is apertured such that when positioned between the light source 28 and the photo diodes 26, and made to rotate, it chops the light beam irradiating the dual photo diodes. The geometry of the light source, disc and photo diodes is such that first one and then the other of the paired diodes will receive a disproportionate amount of radiation. The output signal from the difference amplifier 30 varies in a manner proportional to the difference in the radiation reaching the photo diodes 26.

As may be seen from FIG. 1C, the width of one aperture or window on the disc 24 is the same as the width of the nonlight transmitting spacing between successive apertures on the disc; the disc being so positioned with respect to the light source 28 and the photo diodes 26 that the amount of light passed by each aperture equals the width of the two paired photo diodes. Since the width of the spacing between successive apertures is the same as the width of an aperture this means that both photo diodes go alternately from an all light to an all dark condition. The manner by which the photo cells are unbalanced in the transition from all light to all dark and vice versa results in an unbalance of the photo diode current so as to produce an approximately linear change in the difference current between the two photo diodes. The symmetry of the system is such that when both diodes are in an all light or an all dark condition there will be an essentially balanced condition between the two photo diode currents.

A power supply of conventional design (not shown) is used to energize the light emitting diode 28 of FIG. 1B. The power supply, represented generally in FIG. 1B as member 32, provides an output which in part is used to supply a constant current source 33, the output of which in turn flows essentially through diode 36, the latter being inserted to compensate for the base-to-emitter drop of transistor 35 of the transconductance amplifier 34. The diode 36 is connected in series with a thermistor 38 which has a temperature coefficient which complements the temperature coefficient of light emitting diode 28. The inter-relationship of members 34, 35, 36, 38 and 28 is such that the voltage developed at the point common to both the diode 36 and the base of the transistor 35 is a function of the ambient temperature. Since the voltage at the base of transistor 35 controls the output current of the transconductance amplifier 34, the latter directly reflects the ambient temperature. Also, since the transconductance amplifier 34 in turn drives light emitting diode 28 the latter operates at constant LED output independent of temperature. A variable resistor 37 is inserted into the transconductance amplifier circuit 34 to adjust initially for component tolerances such that the output of the difference amplifier 30 is maintained at approximately 10 volts peak-to-peak; or alternatively, that the motor 18 will maintain a prescribed speed for a reference velocity command, the latter feature being unrelated to the subject of the present invention.

Rotation of the disc 24 results in the generation of a ramp shaped waveform at the output of the difference amplifier 30. The ramp shaped function rises to a maximum value as one or another of the two photo diodes 26 becomes totally illuminated; it passes through the null reference level as both photo diodes are equally illuminated; and, goes to a negative peak as the other of the two photo diodes becomes totally illuminated. The ramp shaped signal appears at the output of the Position Sensor 22 of FIG. 1 as the waveform 22A. The waveform 22A is in turn inputted into a Schmitt Trigger 23 whereby pulses corresponding to successive positive peaks are generated. The output signals from the Schmitt Trigger are in turn inputted into a flip-flop 29, the output of which constitutes a MOVE INDEX signal which occurs once for each columnar increment for which the punch card is advanced.

The apertures on the disc 24 are such that a one-to-one correspondence exists between alternate successive positive or negative peaks of the signal generated at the output of the differential amplifier 30 and a displacement of one columnar position, i.e., 0.087 inch, of the punch card 10 effected by way of the indexing mechanism. If now a particular one of the apertures on the disc 24 is referenced to a point on the punch card then any desired displacement of the punch card may be effected by moving the card by way of the indexing mechanism and at the same time counting the peaks occurring at the output of the difference amplifier 30 until the punch card has been translated through the desired number of columns.

The ramp-shaped waveform 22A generated at the output of the position sensor 22 also serves as a feedback signal to the DC motor 18. As such, the output of the position sensor 22 is connected to the input side of position transfer logic 25. Logic 25 functions to convert the output of the sensor 22 into some meaningful drive signal for driving the DC motor 18. In so doing the column count information derived from the sensor 22 is combined with input information from the central control portion of the data recorder defining the next stop position on the punched card. Appropriate circuitry, which may comprise a counter operative in conjunction with a comparator, registers the column count information and permits a POSITION signal to be selectively gated into member 25 until a favorable comparison is effected between the column count and the information defining the succeeding stop position. To this end a signal is generated within the position transfer function logic of member 25. This signal, after being amplified in power amplifier 21, serves to step motor 18 thereby rotating the index wheel 12 through a sufficient arc to translate the punch card 10 through 0.087 inch for every two complete cycles of the waveform 22A. Further details of the position transfer function logic used in the implementation of the preferred embodiment of the present invention are to be found in FIGS. 3 and 5 hereof in conjunction with the explanations thereof appearing elsewhere herein and in the aforementioned Romeo et al. U.S. patent application Ser. No. 402,328.

As noted above, there exists in the preferred embodiment of the present invention a ratio of two complete cycles of the ramp-shaped waveform for each column of the punch card. Taking into account the fact that the preferred embodiment of the present invention increments the punch card through the work station in minimal steps of two columns each, it follows that at least four cycles of the ramp-shaped waveform are registered per step of the indexing means. Further, since the preferred embodiment of the present invention is implemented to selectively increment the punch card through any desired number of columnar locations, it is possible that a cycle count of 156 may be registered in the course of processing a conventional 80 column punch card through a single step.

The number of cycles of the ramp-shaped waveform per column of the punch card may be altered by simply increasing or decreasing the number of apertures on the disc 24. The significance of such a change should become more readily apparent from the following explanation of a portion of one cycle of the waveform 22A, as depicted in FIG. 2A. The segment of the waveform 22A represented in FIG. 2A comprises a straight line portion having a negative slope. Resolving the straight line into horizontal and vertical components results in a representation of shaft position by way of the horizontal component while the vertical component represents displacement about a DC null level; the latter signal being more readily interpreted in terms of a difference signal generated at the output of the amplifier 30 of FIG. 1B.

If the output of the difference amplifier 30 represents a control signal in a closed loop DC servo system which includes DC motor 18, then the shaft 20 of the motor 18 will tend to "lock-in" when the dual diodes 26 are equally illuminated. The point "E" on the negatively sloping diagonal line of FIG. 2A represents the relative position on the output waveform generated by the position sensor 22 where lock-in occurs under conditions whereby the dual diodes 26 receive equal amounts of illumination. This is a point of relative stability for the motor 18 and hence shaft 20; the point being referred to herein as a nominally stationary shaft position.

Since shaft position is directly translatable into relative orientation of the index wheel 12 there exists a means for establishing a correlation between the nominally stationary shaft position and a line passing through the center of a column of punch dies; it being intended that the punch dies be correctly aligned with a column of punch positions on the punch card. It should be noted that the problem being confronted by the subject invention is that of maintaining as exact a degree of coincidence as is possible between the punch dies and the respective punch positions on the punch card. Thus, in a properly aligned system wherein all construction tolerances have been met and wherein humidity conditions are constant, the translation of a punch card through any number of columns should result in the establishment of a new nominally stationary shaft position which maintains the punch dies in exact registration with the theoretical center line of the corresponding columnar punch positions on the punch card. Since these idealized conditions are not always met and in any event will change relative to changes in humidity, it has been found that it is possible to compensate for such changes by introducing a signal into the feedback loop of the servo system so as to offset the point on the negatively sloping diagonal at which the servo mechanism locks-in. The result of introducing such a compensation signal into the feedback loop is to move the point at which the servo locks-in from point E to some other point on the diagonal line of FIG. 2A. Since the diagonal line represents a linear approximation of the shaft position, the introduction of a compensating signal in the feedback loop of the servo mechanism may be used to impart a correction factor to the shaft position of motor 18 and hence to the punch card.

In the preferred embodiment of the present invention the disc 24 is designed to generate two complete cycles of the ramp-shaped waveform per column of the punch card, and since the intercolumnar separation of an 80 column punch card is nominally 0.087 inch, the negatively sloping diagonal line of FIG. 2A represents one-quarter of the columnar separation, or approximately 22 mils. Of the 22 mils only a little over one-half, or approximately 12 mils, is available for compensation purposes since the end portions of the negatively sloping diagonal line are necessary as guard bands to insure servo stability. This follows since the servo is stable in the position mode only while on the negative slope of the triangular waveform. Also at the peaks of the triangular waveform some non-linearity will generally exist resulting in a further reduction of stability in these regions.

The 12 mils of reliable compensating range may be increased by reducing the number of cycles of the ramp-shaped waveform per column of the punch card from two to one, in which event the diagonal line of FIG. 2A represents some 44 mils of space on the punch card which in turn yields a reliable compensation range of approximately 24 mils. Similarly, the preciseness with which the indexing is effected may be improved by increasing the number of cycles of the ramp-shaped waveform per columnar separation; however, the range of compensation will be necessarily reduced.

In reality, the 12 mil compensation range afforded by the preferred embodiment of the present invention is more than adequate to compensate for any reasonably expected variation introduced by way of mechanical tolerances, humidity conditions, or similar causes. It should be understood that errors due to tolerances or humidity may be small relative to the spacing between adjacent columns on the punch card; however, cumulatively over the entire length of the card these may be substantial enough to introduce an error condition during the course of subsequent processing of a prepunched card. It should be apparent that correction factors need not be introduced on a columnar basis; but rather, it has been found that two or three corrective steps distributed over the length of the card will ensure that any cumulative error factor will not exceed the allowed tolerances.

It is possible to introduce a correction factor in either of two ways; namely, by initially moving the punch card 10 to one side or the other of the null reference line, thus affording some 6 mils of compensation; or, by moving the shaft 20, i.e. by advancing or retarding it, so as to allow the correction factor to be distributed over the entire compensation range, i.e., the 12 mils of FIG. 2A. Practical considerations dictate the adoption of the latter approach since the range of compensation is thereby effectively doubled over that otherwise available. This latter approach is reflected in FIGS. 2A, 2B, 2C, which depict a three-step compensation technique for either a long or a short condition.

FIGS. 2A and 2B depict a three-step correction of a long condition whereby a correction factor of 4 mils is introduced at the 20/21st, 40/41st, and 60/61st columnar positions. The long condition exists when it is ascertained that the spacing between adjacent columnar positions on the punch card is slightly in excess of the 0.087 inch standard. Problems which might otherwise develop in light of the long condition will be avoided if the spacing is periodically shortened. To this end, the nominally stationary shaft position is advanced some 6 mils just prior to registration of the punch card at the work station. At the conclusion of the registration step the pinch wheel 14 moves into engagement with the punch card 10. It is important to note that in the practice of the preferred embodiment of the present invention the determination of whether or not to compensate and the nature of the compensation steps to be effected is translated into shaft position prior to the time the pinch wheel 14 is moved into engagement with the punch card. It should be further noted that in the practice of the preferred embodiment of the present invention an 80 column punch card will be incremented through some 78 columns, 2 columns at a time, following initial registration of the punch card at the work station. Thus, in compensating for the long condition, just prior to registration of the punch card at the work station the servo system is made to lock-in at the threshold level defined as point D on the waveform and remains locked-in at the D threshold through the succeeding 18 columns, then it locks-in at the C threshold for the next 20 columns, it locks-in at the B threshold for the next 20 columns, and finally it locks-in at the A threshold for the final 20 columns.

If, as indicated in FIGS. 2A and 4, the separation between adjacent threshold levels of the servo system corresponds to some 4 mils of spacing on the punch card then, while most all of the 39 increments incurred in processing a single 80 column punch card in the preferred embodiment of the present invention are 0.174 inch (i.e. 2 × 0.087 inches) as is depicted in FIG. 4, an increment of 4 mils will be added to or subtracted from the standard increment of 0.174 inch between positions 18/19 and 20/21, again between positions 38/39 and 40/41 and finally between positions 58/59 and 60/61. As a result there is a corresponding lengthening or shortening of the distance between the first and last columnar positions, i.e. columns 1/2 and columns 79/80, of some 0.012 inch.

As indicated in FIGS. 2B and 4, when the long condition exists it must be corrected in order to prevent a card from being punched too long. In the preferred embodiment of the present invention this is accomplished by reducing the normal increment of 0.174 inch by a factor of 0.004 inch at three points over the length of the card. This is the case indicated in FIGS. 2A and 4; the effect of the correction factors being depicted in FIG. 4. Also depicted in FIG. 4 are situations in which no compensation action is taken and alternatively wherein a short card condition exists.

A short condition exists when the apparatus for preparing the punch card normally results in a punch card wherein the intra-column separation is too short. It thus becomes necessary to increase the overall punch separation. This is done by initially retarding the shaft 20 before energizing the pinch roll 14 and thereafter introducing an additional increment of 0.004 inch after the 9th, 19th, and 29th increment, as may be seen upon reference to FIG. 4. Initially retarding the shaft 20 results in an increase in the overall amount of card surface which comes into contact with the surface of the index wheel in the course of completing the transfer of a punch card through the work station than would otherwise be the case. In similar fashion, preliminarily advancing the shaft 20 results in a decrease in card surface transferred per card cycle resulting in a shorter than normal card thus correcting for a long card condition which might otherwise result.

Consideration is now given to those portions of the programmably alterable incrementing system of FIG. 1 which give rise to the generation of the compensating signals. Referring first to the timing chart of FIG. 5, of both this and the aforementioned Romeo et al patent application, it will become apparent that all timing is governed by the PUNCH SPROCKET signals which occur at a nominally internal rate of 29.6 milliseconds (ms). In the preferred embodiment of the present invention, the PUNCH SPROCKET signals are derived from a reluctance pick-up attached to the shaft 18. It will be further noted from the timing diagram of FIG. 5, that the register roll 12 operates to register the trailing edge of the card coincident with the PUNCH SPROCKET pulse occuring some three cycles prior to the punching of columns 1 and 2. The pressure roll 14 is held open until the trailing edge of the reference pulse associated with columns 1 and 2 occurs. By that time the card is properly registered at the work station. For further details of the registering of the punch card at the work station reference is made to the aforementioned co-pending application of Alexander Hunter, Ser. No. 374,869, filed June 29, 1973.

The pressure roll 14 closes prior to that portion of the punch cycle wherein the selected punch dies are made to penetrate the corresponding punch positions of columns 1 and 2 of the punch card. At the completion of each punching operation, a MOVE FF logic command is generated which indexes motor 18, thus advancing the punch card 10 two columns at a time. It will be noted that the MOVE FF signal is generated in timed relationship with respect to the PUNCH SPROCKET signal so as to insure that card motion does not occur while the punches are actually penetrating the card. In this respect, punch penetration occurs after the trailing edge of the MOVE FF signal, but prior to the leading edge of the succeeding PUNCH SPROCKET signal. Two MOVE INDEX signals occur for each incremental advancement of the card surface. This follows since the motor 18 makes double increments, advancing the punch card two columns at a time while in the punching mode.

Referring now to FIG. 3A, and the corresponding member 40 of FIG. 1, a STEP PUNCH COLUMN COUNT signal is generated at the output of AND gate 50 for each PUNCH SPROCKET signal occuring during punch time, provided further that the Punch Data Inhibit Not condition obtains. Since the punch card is advanced two columns for each PUNCH SPROCKET signal, a total of 39 STEP PUNCH COLUMN COUNTS will be generated in the processing of columns 1 through 80. The output of the Column Counter Pulse Generator 40 of FIG. 1, which corresponds to the output of AND gate 50 of FIG. 3A, appears as an input to the Offset Control Counter of FIG. 3B. The latter comprises a Binary To Decimal Counter 52 wherever overflow occurs on the tenth count, assuming the counter to have initially been reset to zero. The reset condition is established by a $\overline{\text{CLR SET}}$ signal which is effective in resetting the Offset Control Counter of FIG. 3B to a count of zero. The $\overline{\text{CLR SET}}$ signal occurs at the onset of each punch cycle, being removed on the registration of columns 1 and 2 and remaining thus until the registration of column count 79 and 80 is complete.

During the period of time the $\overline{\text{CLR SET}}$ signal is removed, the Offset Control Counter, corresponding to member 42 of FIG. 1, responds to each incoming STEP PUNCH COLUMN COUNT signal from the Column Count Pulse Generator of FIG. 3A. Every tenth STEP PUNCH COLUMN COUNT signal generates an overflow condition resulting in a Carry at the output of the Binary To Decimal Counter 52 of FIG. 3B. The two column incrementing system adopted in the preferred embodiment of the present invention means that a Carry signal will occur between columns 20 and 21, 40 and 41, and 60 and 61.

The Carry signals occuring at the output of the Offset Control Counter of FIG. 3B are buffered through Gate 54 into the Decode Logic of FIG. 3C which corresponds to member 44 of FIG. 1. The Decode Logic comprises a plurality of sequentially gated flip-flops 56, 58, 60, 62, 64, and 66, which are appropriately reset by the aforementioned $\overline{\text{CLR SET}}$ signal under the conditions described above with respect to the resetting of the Binary To Decimal Counter of FIG. 3B. As each tenth STEP PUNCH COLUMN COUNT signal is registered at the input of the Binary To Decimal Converter 52 of FIG. 3B, a Carry signal is generated. The leading edge of the first Carry signal sets flip flop 56 which in turn enables flip flops 58 for the next Carry signal. This first Carry signal also enables flip flop 62 such that the latter is responsible to the MOVE INDEX signal characterising the punch cycle corresponding to columns 21 and 22. As will be noted upon reference to FIG. 5, the trailing edge of this MOVE INDEX signal sets flip flop 62.

Flip flop 58, in turn, enables flip flops 60 and 64 during the punching of columns 41 and 42. That is, when the next Carry signal is generated in the Binary To Decimal Counter 52, flip flop 64 is set by the trailing edge of the MOVE INDEX signal associated with punch column 41 and 42. The leading edge of the next Carry signal sets flip flop 60 which enables flip flop 66. Similarly, the trailing edge of the MOVE INDEX signal associated with punch columns 61 and 62 sets flip flops 66. As will be noted, the output of flip flops 62, 64, and 66 constitute conditioning input signals to field effect transistors 68, 70, and 72 respectively, located within the DC Null Offset Signal Generator of FIG. 3D.

The outputs of the field effect transistors 68, 70, and 72 are combined at a common summing node 100. In the preferred embodiment of the present invention, the signal level at the summing node 100 always has a value equivalent to a 6 mil offset when field effect transistors 68, 70, and 72 are open. The source of the offset signal at the summing node 100 is determined by resistor 80 and a positive reference voltage 82. Initially at columns 1 through 20, flip flops 62, 64, and 66 are all reset such that the associated field effect transistors 68, 70, and 72 are all open. Under these conditions the summing node 100 represents a 6 mil displacement such as is represented at points A or D on the diagonal line of FIG. 2A. Since, at punch column 21 and 22 the carry signal generated at the output of the binary to decimal counter 52 is effective in setting flip flop 62, this enables the field effect transistor 68 to close. At the same time, resistor 83 combines with the reference voltage 71 to effectively subtract an equivalent 4 mil offset from the existing 6 mil offset resulting in the generation of a signal at the summing node 100 which represents a 2 mil offset, i.e., point B or C on the diagonal line of FIG. 2A. Similarly, at punch column count 41 and 42, another 4 mils of effective error are subtracted, leaving a net offset of minus 2 mils; this condition being established via components FF64, FET70, R86, and V71. Finally, at column 61 and 62, an additional 4 mils are subtracted resulting in a signal at the summing node 100 which represents an offset of minus 6 mils. FF66, FET72, R88 and reference voltage 71 are responsible for generating this final increment to the correction figure established at the summing node 100.

The polarity of the correction factor, and in fact whether or not a correction factor will be applied, is determined by the position of a switch 74 operative in conjunction with two unity gain inverting amplifiers 76 and 78. With the switch 74 in the neutral position (i.e., as is shown in FIG. 3D), no compensation will be injected into the position transfer function logic 25. If the switch is in the "L" position, the output at point 85 will be a correction factor corresponding to an initial positive 6 mils decreasing in 4 mil increments to a minus 6 mils at punch column 61 and 62. This result is achieved by way of the double inversion introduced by summing amplifier 76 and 78. Conversely with the switch 74 in the "S" position, a single inversion will occur through amplifier 78 so that the initial offset will be from a negative 6 mils, increasing in 4 mil increments to a positive 6 mil offset at punch columns 61 and 62.

The output from the summing node 100 is selectively gated through the Position Transfer Function Logic of FIG. 3E, corresponding to member 25 of FIG. 1, where it is summed with the output of the position sensor 22 to in turn drive the motor 18 in the manner outlined above.

Having now described our invention what we claim is:

1. A programmably alterable incrementing system for punch cards, or like sheet material, the surface of each punch card or sheet material being divided into a predetermined number of rows and columns, said incrementing system being adapted to incrementally index said punch card or sheet material through a work station, comprising indexing means including an index wheel adapted to operatively engage the surface of said punch card or sheet material to thereby advance said card or sheet material through said work station, control means operatively connected to said index wheel to rotate said index wheel a predetermined amount so as to cause said punch card to be selectively advanced such that a particular one of said predetermined number of rows or columns is brought into registration with respect to a reference point at said work station, and switching means operatively connected to said control means and adapted when set to introduce one or more predetermined compensating factors into said indexing means so as to compensate for differences in intended and actual incremental displacement brought about by changes in the dimensions of the operative components of said incrementing system and/or in said punch card or sheet material.

2. An incrementing system for punch cards, or like sheet material, said incrementing system being adapted to incrementally index said punch card or sheet material through a work station, comprising first means adapted to operatively engage the surface of said punch card or sheet material to thereby advance said card or sheet material through said work station, control means operatively connected to said first means to cause said punch card or sheet material to be selectively advanced a predetermined distance through said work station, and means operatively connected to said control means and adapted when set to introduce one or more predetermined corrective factors to compensate for differences in intended and actual incremental displacements introduced in the advancement of said punch card or sheet material through said work station said differences being brought about by changes in the dimensions of the operative components of said first means and/or in said punch card or sheet material.

3. An incrementing system for punch cards of like sheet material of the type wherein said punch card or sheet material is selectively incremented through a work station, comprising indexing means adapted to operatively engage the surface of said punch card or sheet material to thereby advance said punch card or sheet material through said work station, said indexing means further comprising drive means, position sensing means operatively connected to said drive means for establishing the relative position of said punch card or sheet material as it is advanced through said work station, control means operatively connected to said drive means and adapted to generate control signals determinative of each incremental advancement to be imparted to said punch card or sheet material being advanced through said work station, and means operatively connected to said control means for introducing one or more predetermined compensating factors to compensate for differences in intended and actual incremental advancements being imparted to said punch card or sheet material, said last named means comprising counting means operatively connected to said position sensing means to determine the exact point or points along the transfer path of the punch card or sheet material at which said one or more predetermined compensating factors is to be introduced, said last named means further comprising means to determine the polarity of said one or more predetermined compensating factors to be introduced and for generating a signal proportional in magnitude to the correction to be effected.

4. An incrementing system constructed in accordance with the principles of claim 3 wherein plural correction factors are introduced at at least three points along the transfer path of said punch card.

5. An incrementing system in the nature of that described in claim 3 wherein the last named means comprises a selectively settable switch to thereby permit the introduction of an additive factor, a subtractive factor, or no compensation factor.

6. An incrementing system in the nature of that described in claim 3 wherein the last named means comprises a selectively settable switch to alternatively increase or decrease the columnar spacing between selective groups of columns of a standard punch card.

* * * * *